(12) United States Patent
Singh

(10) Patent No.: US 10,390,217 B2
(45) Date of Patent: Aug. 20, 2019

(54) WIRELESS CONFIGURATION OF WIRELESS DISTRIBUTION SYSTEM (WDS) WI-FI RANGE EXTENDERS USING NON-WI-FI-WIRELESS COMMUNICATION CHANNELS

(71) Applicant: Cloudmondo, Inc., Santa Clara, CA (US)

(72) Inventor: Rajinder Singh, San Jose, CA (US)

(73) Assignee: Neutrino8, Inc., Santa Clara, CA (US)

( * ) Notice: Subject to any disclaimer, the term of this patent is extended or adjusted under 35 U.S.C. 154(b) by 73 days.

(21) Appl. No.: 15/391,790

(22) Filed: Dec. 27, 2016

(65) Prior Publication Data

US 2018/0184283 A1 Jun. 28, 2018

(51) Int. Cl.
*H04W 8/22* (2009.01)
*H04W 76/15* (2018.01)
*H04W 84/20* (2009.01)
*H04W 84/12* (2009.01)
*H04W 24/02* (2009.01)

(52) U.S. Cl.
CPC .............. *H04W 8/22* (2013.01); *H04W 76/15* (2018.02); *H04W 24/02* (2013.01); *H04W 84/12* (2013.01); *H04W 84/20* (2013.01)

(58) Field of Classification Search
CPC ....... H04W 8/22; H04W 76/15; H04W 84/20; H04W 76/02; H04W 72/08; H04W 76/10; H04W 72/085; H04W 24/02; H04W 12/04; H04W 12/02; H04W 8/26; H04W 16/32; H04W 36/18; H04W 36/08; H04W 36/14; H04W 84/12; H04W 36/0055; H04W 16/16; H04W 36/22; G06F 13/40; G06F 13/00; G06F 13/102; G06F 13/4022; G06F 13/4081; G06F 1/1632; H04L 9/08; H04L 29/06; H04L 9/0891; H04L 63/06; H04L 63/0428; H04L 9/16; H04L 12/28; H04L 12/56
See application file for complete search history.

(56) References Cited

U.S. PATENT DOCUMENTS

| | | | |
|---|---|---|---|
| 9,143,400 B1 | 9/2015 | Roskind | |
| 9,609,519 B2 | 3/2017 | Chen | |
| 2013/0304879 A1 | 11/2013 | Schmidt | |
| 2014/0073289 A1 | 3/2014 | Velasco | |
| 2015/0077231 A1 | 3/2015 | Kang | |
| 2015/0078342 A1* | 3/2015 | Chen | H04W 76/10 370/331 |
| 2015/0081837 A1 | 3/2015 | Bernier | |

(Continued)

*Primary Examiner* — Hardikkumar D Patel
(74) *Attorney, Agent, or Firm* — Law Office of Dorian Cartwright; Dorian Cartwright

(57) ABSTRACT

A configuration server detects a network change and initiates a configuration process. A smartphone executing a mobile app communicates with the configuration server with a cellular data network transceiver (e.g., a 3G or 4G transceiver), and communicates with slave base stations with a Bluetooth transceiver (e.g., a BILE transceiver) or other one-to-many wireless channel. The configuration server also communicates over a wired connection with a master base station to synchronize WDS configuration data between the master and slave base stations. WDS configuration data is dynamically generated to prevent rogue devices from using preconfigured WDS configuration.

8 Claims, 12 Drawing Sheets

(56) References Cited

U.S. PATENT DOCUMENTS

| | | |
|---|---|---|
| 2016/0219631 A1* | 7/2016 | Chen .................... H04W 76/10 |
| 2017/0111173 A1* | 4/2017 | Sugitani ................ H04L 9/0891 |
| 2017/0134940 A1 | 5/2017 | Sharma |
| 2017/0135085 A1 | 5/2017 | Kaushik |
| 2017/0289885 A1 | 10/2017 | Kaushik |
| 2017/0300732 A1 | 10/2017 | Likar |

* cited by examiner

WIRELESS CONFIGURATION OF WIRELESS DISTRIBUTION SYSTEM (WDS) WI-FI RANGE EXTENDERS USING NON-WI-FI-WIRELESS COMMUNICATION CHANNELS

FIELD OF THE INVENTION

The invention relates generally to a computerized networking system, and more specifically, to configuration of wireless distribution system (WDS) nodes that extend Wi-Fi network range using a mobile station with alternate networking capabilities.

BACKGROUND

Plug and play networking equipment makes networking friendlier for consumers installing a Wi-Fi (e.g., under a IEEE 802.11 protocol as promulgated by the Institute of Electrical and Electronics Engineers) system out of the box. Entities also desire less complex configurations when making changes to network equipment. Depending on a size of network coverage needed, range extenders are added at "dead areas" to provide extended Wi-Fi access. For example, a range extender can add coverage to a backyard of a home. Also, a range extender can connect two buildings of a corporation.

Conventional configuration techniques for range extenders are performed through a wired connection by a network administrator, over several steps. First, the network admin connects a wire to an access point to receive parameters. Next, the network admin connects a wire to a range extender to upload parameters. Even if the network admin wants to wirelessly connect to the access point and the range extender, the point-to-point nature of Wi-Fi radios prevents a dual connection. Further, interference between multiple Wi-Fi radios would be problematic.

More specifically, WDS is a technique for an access point acting as a master base station to connect with access points acting as slave base stations for extending Wi-Fi range. The master base station needs to receive MAC addresses of the slave base stations, and likewise, the slave base stations need to receive a MAC address of the base station. Other parameters in common include an SSID, a wireless channel, and an encryption mode. As described above, conventional techniques accomplish configurations with a series of wired connections.

What is needed is a robust technique for wireless configuration of wireless distribution system nodes, for example, using a wireless communication channel other than Wi-Fi for synching WDS configuration data necessary for extending Wi-Fi range.

SUMMARY

The above-mentioned needs are met with methods, computer products, and devices for a computer-implemented method for wireless configuration of wireless distribution nodes using a mobile station with alternative networking capabilities.

In one embodiment, a configuration server detects a network change and initiates a configuration process. A smartphone executing a mobile app communicates with the configuration server with a cellular data network transceiver (e.g., a 3G or 4G transceiver), and communicates with slave base stations with a Bluetooth transceiver (e.g., a BTLE transceiver) or other one-to-many wireless channel. The configuration server also communicates over a wired connection with a master base station to synchronize WDS configuration data between the master and slave base stations.

In another embodiment, WDS configuration data is dynamically generated to prevent rogue devices from using preconfigured WDS configuration.

In another embodiment, a smartphone executing a mobile app communicates directly with a master base server with a Wi-Fi transceiver, and with a slave base server with a Bluetooth transceiver for synchronizing WDS configuration data.

Advantageously, out of the box WDS configurations of Wi-Fi networks with range extenders are simplified.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for wireless configurations of WDS over alternative wireless communication channels, as described herein. One of ordinary skill in the art will recognize variations to the disclosed embodiments that are contemplated, although not explicitly described.

I. Systems for Wireless WDS Configuration System (FIGS. 1-6)

Figure 1A:
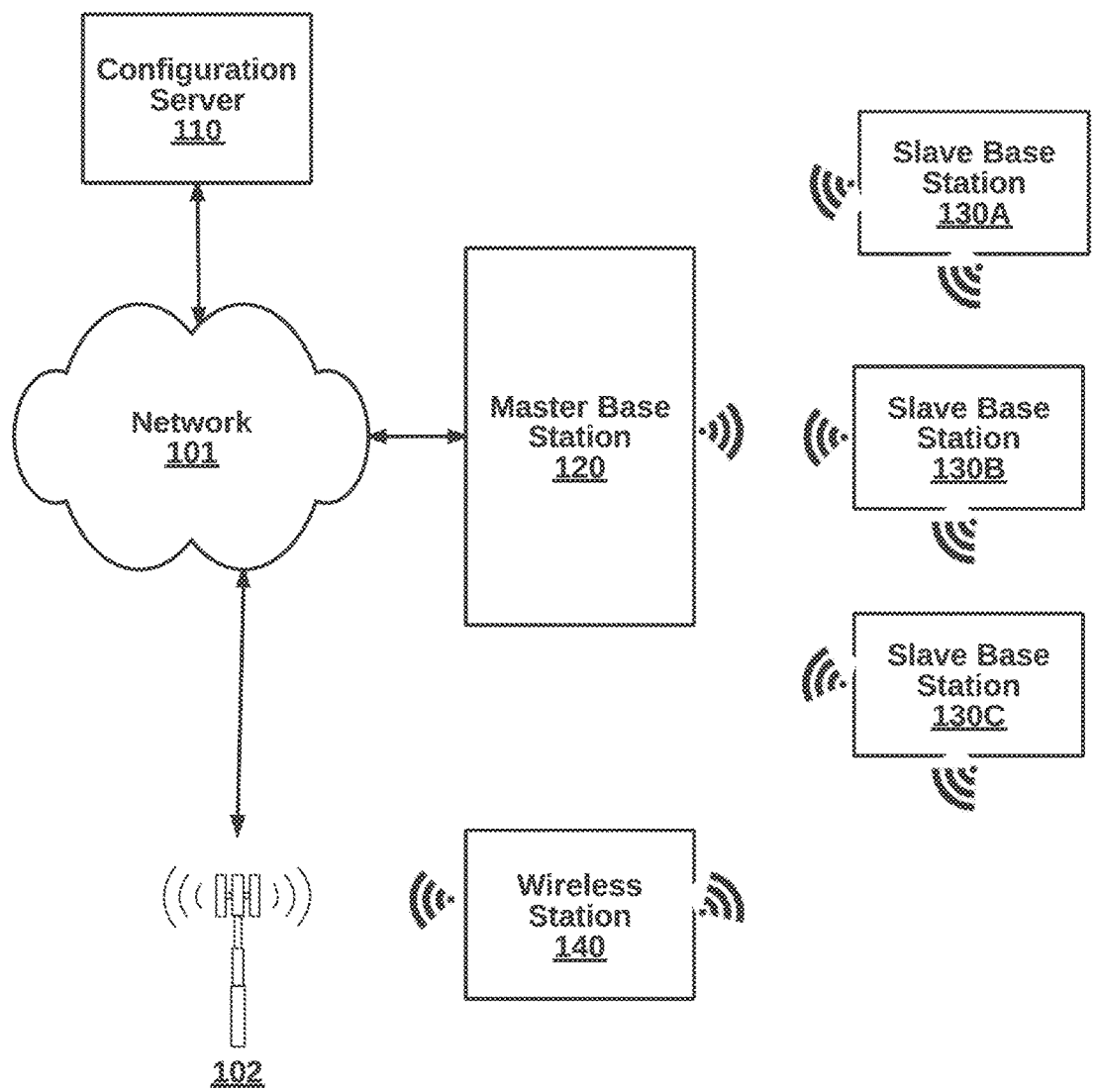
FIGS. 1A & 1B are high-level block diagrams illustrating systems for wireless configuration of wireless distribution nodes using a mobile station, according to one embodiment.
Figure 1B:
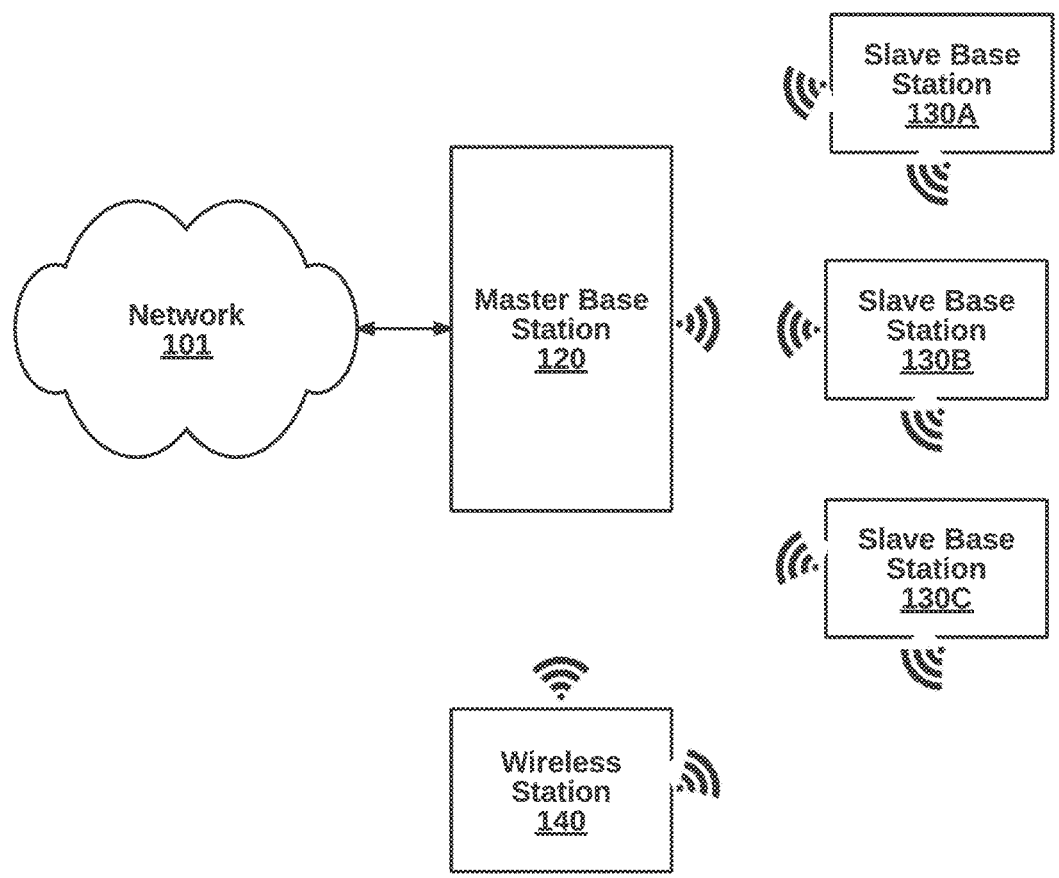

FIGS. 1A-1B are high-level block diagram illustrating wireless WDS configuration of network nodes, according to one embodiment. The system 100A of FIG. 1A comprises a configuration server 110, a master base station 120, slave base stations 130A-C, and a wireless station 140. In other embodiments, additional network components can also be part of the systems 100A and 100B, such as firewalls, virus scanners, routers, switches, application servers, databases, as well as additional controllers, access points, access switches, stations, and the like. The network components as set forth throughout the different embodiments described herein can be implemented as hardware, software, or a combination of both. The systems 100A and 100B can be implemented in home networking systems with easy consumer set-up. Also, enterprise networking systems can be quickly deployed and relocated.

The components can communicate through a network 101. The network 101 couples the configuration server 110 to the master base station 120, preferably over a wired connection. In turn, the master base station 120 couples to the slave base station 130, and the wireless station, through wireless connections. The network 101 can be the Internet, a wide area network, a local area network, an enterprise network, or the like. The network 101 can be a data network or a cellular network (e.g., 3G or 4G), or a combination of different types of networks. In addition, a base station 102 communicates through the network 101 (e.g., indirectly through a gateway directly coupled to the network 101).

The configuration server 110 bridges the master base server 120 and the slave base server 130 during configuration of the system 100A. More specifically, WDS configuration data is synchronized between the master and slave base stations 120, 130 in facilitating a wireless connection between the master and slave base stations 120, 130 in this embodiment. The wireless station 140 can include an application that establishes a secure connection for receiving dynamic WDS configuration data over a cellular data network transceiver (e.g., 3G or 4G), and next, transmitting the dynamic WDS configuration data over a Bluetooth transceiver. On the other data path between the configuration server 110 and the master base station 120 can be a secure connection over an Ethernet port for a wired connection. The data path includes an interface between a data network used by the configuration sever 110 and a cellular network used by the wireless station 110.

The WDS configuration data is synchronized by the configuration server to facilitate a connection between the master and slave base stations 120, 130, in one embodiment. WDS configuration data, in one embodiment, includes MAC addresses, BSSIDs, authentication credentials, wireless channels, encryption modes (e.g., certificates or shared secrets), and other information necessary for a Wi-Fi connection between the master and slave base stations 120, 130. There are other embodiments in which the WDS configuration data also includes authentication information or other security information. Dynamic WDS information, in another embodiment, can comprise WDS parameters generated on-the-fly to avoid prior art out-of-the-box WDS parameter that are pre-configured. Synching between the master and base stations 120, 130 is achieved through multiple communication channels as managed by the wireless station 140. For example, a BSSID can be randomly generated and send form the configuration server 110 to both the master base station 120 and the slave base station 110. The slave base station 110, in turn, uses the BSSID to send a probe request or respond to a beacon of the master base station 120. Authentication credentials can also be presented by the slave base station 130 to the master base station 120. Some of the dynamic WDS information can be static and predefined, such as authentication credentials.

In one embodiment, when one of the slave base stations is removed from the network or otherwise disassociated from the master base station 120, new dynamic WDS configuration data can be sent out to re-secure the compromised network.

The configuration server 110 and other components of the system 100 can be any computerized device or processor driven device. Example embodiments include server blades, desktop computers, laptops, smart telephones, tablets, phablets and the like. In some cases, the configuration server 110 is operated by a service provider that services various user accounts. The configuration server 110 can be the same entity that manufactures the master and slave base stations 120, 130. More detailed embodiments of the configuration server 110 are set forth below with respect to FIG. 2.

The master base station 120 is configured to provide access to the network 101 for wireless stations including wireless station 140. After configuration, wireless stations can be indirectly connected through the slave base station 130. The indirect connection extends the range of the master base station 120 which appears to the wireless station 140 to be the same device as the master base station 120, in some embodiments. In more detail, a BSSID used to identify connections with the master base station 120 can be passed to the slave base station 130. When the station 110 communicates using a certain BSSID associated with both the master and slave base stations 120, 130, either device can process packets from communications. In an embodiment, the master base station 120 can maintain a table that tracks which wireless stations are assigned to be handled by the slave base station 130 and other slave base stations.

Figure 9:
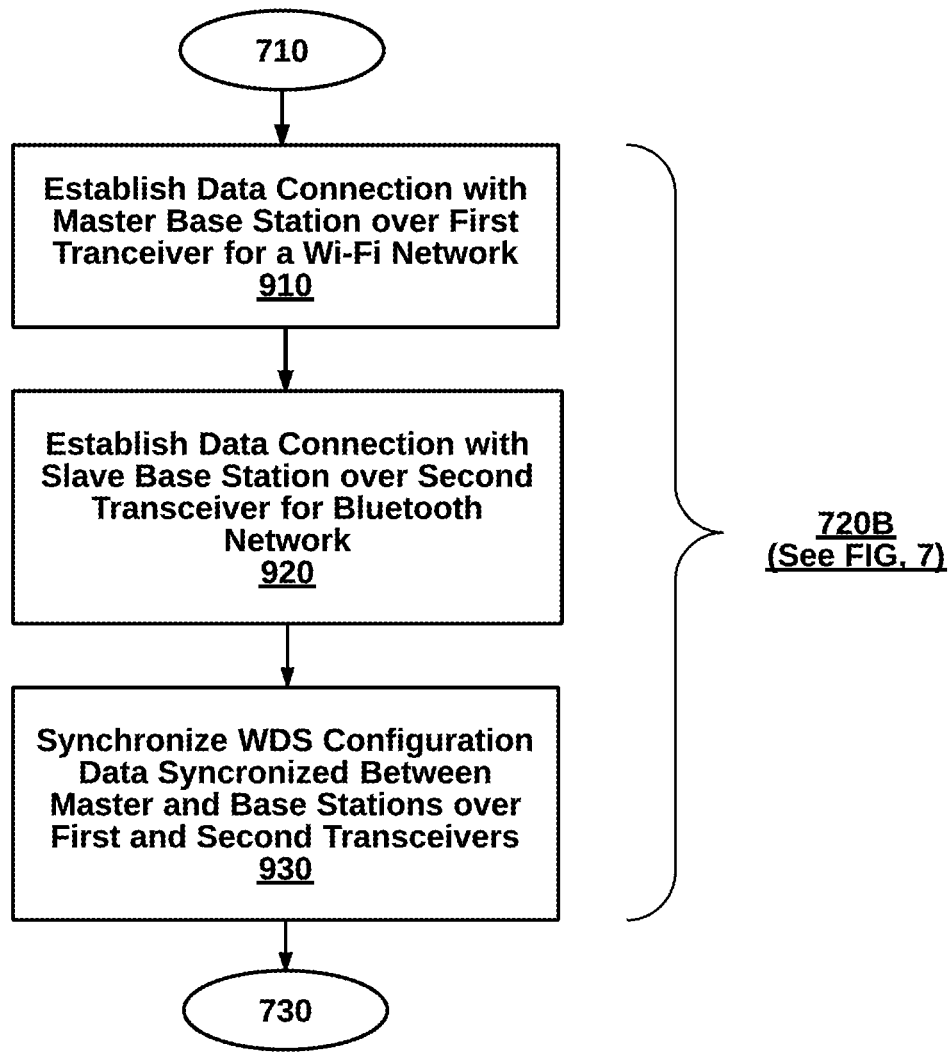
FIG. 9 is a more detailed flow diagram illustrating a second embodiment of a step of synchronizing WDS configuration data between the master base station and the slave base station, from the method of FIG. 7.

In example embodiments, the master base station 120 can be an access point running in master node, a router, or a switch, and be implemented by any of the computerized devices discussed herein, and generally in FIG. 9. More detailed embodiments of the master base station 130 are described in below with respect to FIG. 3.

The slave base station 130 is configured to provide access to the network 101 to wireless stations including the wireless station 140. During configuration, the slave station can communicate with the wireless station 140 over a Bluetooth wireless radio in order to receive WDS configuration data (e.g., dynamic WDS configuration data). After configuration, packets are forwarded from the wireless station 130 to the master base station 120, and vice versa.

In some embodiments, the slave base station 130 can be a range extender, a repeater, an access point running in a slave mode, and be implemented by any of the computerized devices discussed herein, and generally in FIG. 9. The slave base station 130 is described in more detail below in association with FIG. 4.

The wireless station 140 synchronizes WDS configuration data between a Bluetooth transceiver connected to the slave base station 130, and, in a first embodiment through a Wi-Fi transceiver connected to the master base station 120, and, in a second embodiment through a cellular data network transceiver connected to the configuration server 110. Other types of transceivers can also be substituted. The one-to-many capability of Bluetooth allows a single wireless station to configure many slave base stations without having to manually connect and disconnect between, for example, Wi-Fi transceivers of different slave base stations. Some embodiments include a mobile app with user log in information in order to create authenticated communication channels for passing sensitive configuration parameters. The wireless station 140 may also authenticate to the slave base station through the mobile app.

In some embodiments, the wireless station 140 can be a mobile telephone, a tablet, a phablet, a laptop, or be implemented by any of the computerized devices discussed herein, and generally in FIG. 9. For instance, a smart phone is typically equipped with Wi-Fi, Bluetooth and cellular data network transceivers. A mobile app can be downloaded to coordinate between the heterogeneous communication channels. Examples wireless station 130 is described in more detail below in association with FIG. 5.

FIG. 1B, in contrast to FIG. 1A, eliminates the configuration server 110 and connections with the network 101. The locally based configuration features multiple connections over multiple channels to automatically configure wireless devices out of the box. The system 100B includes the master base station 120, slave base stations 130A-C and the wireless station 140.

In one embodiment, a network administrator uses the wireless station 140 to manage configuration of the base slave stations 130A-C to the master base station 110. The wireless station 140 uses Wi-Fi to connect with master base stations and uses Bluetooth to connect with slave base stations. After configuration, the slave base stations 130A-C can be physically distributed for deployment in different geographical locations. Note that the configuration server 110, being accessible wherever cellular data network service is available, can configure slave base stations while already deployed to different geographical areas. More specifically, a network administrator can move to within Bluetooth range of each slave base station for automatic configuration to master base stations.

In some embodiments, a configuration server can be notified of off-line configurations at a later point in time, by any of the participating components.

Figure 2:
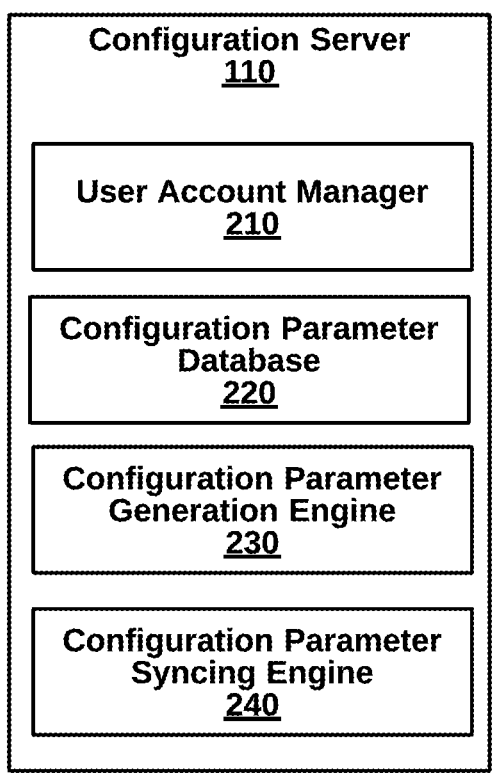
FIG. 2 is a more detailed block diagram illustrating a configuration server of the system of FIG. 1A, according to one embodiment.

FIG. 2 is a more detailed block diagram illustrating the configuration server 110 of the system of FIG. 1, according to one embodiment. The configuration server 110 of this embodiment includes a user account manager 210, a configuration parameter database 220, a configuration parameter generation engine 230, a configuration parameter synching engine 240, and a network communication module.

The user account manager 210 preconfigures a user policy for friend onboarding. In one embodiment, the user account is accessed through a user interface executing on a browser or an independent application. A network owner can access settings of the account. Although the description refers to a network owner throughout, this is non-limiting as other actors can include a network administrator, a home owner, an Internet customer, a hot spot operator, and the like.

The configuration parameter database 220 stores the master base station 120 in association with the slave base station 130, for example, on a user account record. In one embodiment, the configuration server 110 automatically recognizes that the master base station 120 is associated with the slave base station 130, based on geographical coordinates or network IP addresses. In another embodiment, a wireless station has a mobile app for associating slave base stations to a master base station. To initiate, the mobile app collects and sends to the configuration server 110, data about nearby slave base stations that is sent out in slave station beacons. As a result, the configuration parameter database 220 can be queried using the slave base station identification information to identify master base stations for automatic configuration. Then, configuration parameters such as a BSSID are sent to slave base stations for connecting to master slave stations.

The configuration parameter generation engine 230 can create a BSSID in real-time that would be previously unknown to any rogue actors. The BSSID is synchronized to master base stations and slave base stations of a common local area network. In one case, authentication credentials are also synchronized for logging in from slave base stations. The generated parameters are sent to the networking communication module 240 for interfacing with external resources.

The networking communication module 240 can comprise networking interface components such as Wi-Fi radios, Wi-Fi antennae, transceivers, coders and decoders, digital signal processors, and other supporting lower level hardware and processes necessary for communication across channels. The networking hardware 240 can support different variations of IEEE 802.11, including multiple input/multiple output (MIMO) and other techniques. Returning to the task of sending generated parameters to slave base stations, data packets sent over the data network are received by an interface to a cellular data network (e.g., Verizon 4G cellular data network). A cellular data network including, for example, cell towers pass the data packets to wireless stations.

Figure 3:
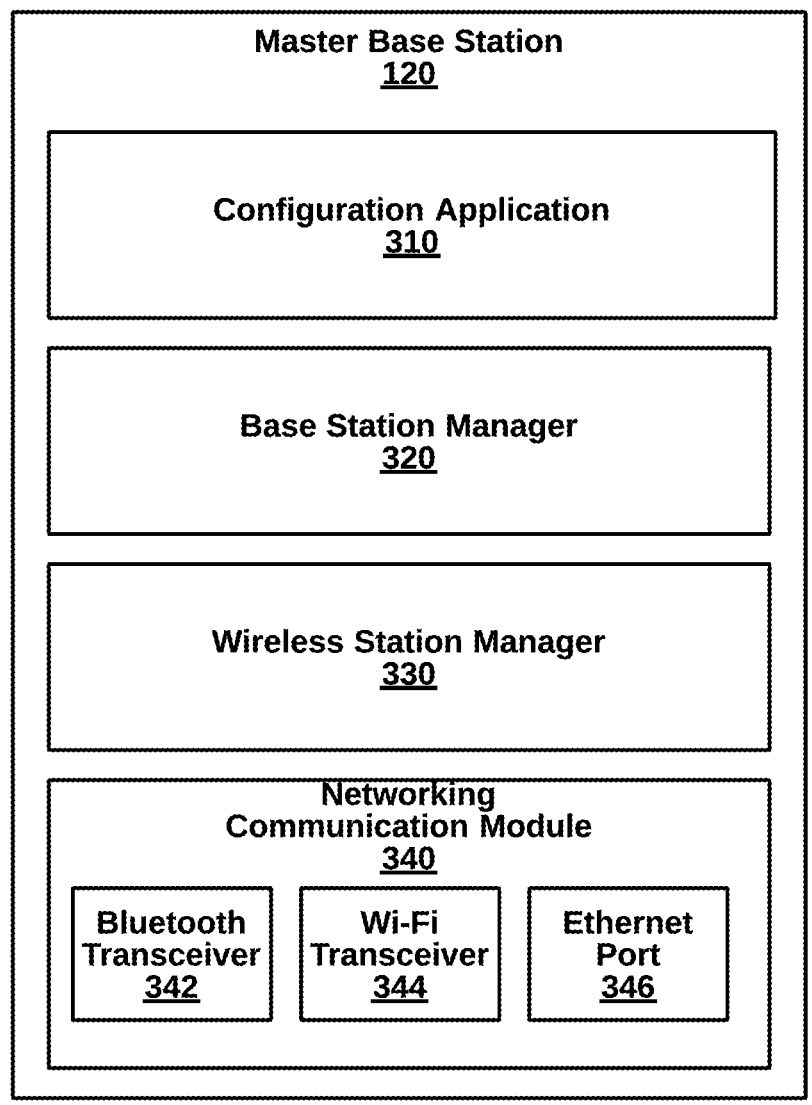
FIG. 3 is a more detailed block diagram illustrating a master base station of the system of FIG. 1, according to one embodiment.

FIG. 3 is a more detailed block diagram illustrating the master base station 120 of the system of FIG. 1, according to one embodiment. The master base station 120 includes a configuration application 310, a slave base station manager 320, a wireless station manager 330, and a networking communication module 340.

The configuration application 310 can be executed as part of an operating system, or alternatively, as an application interacting with an operating system. The configuration application 310 receives dynamic WDS confirmation data. Sometime thereafter, a connection request is received from a slave base station. For example, the connection request can be a probe request using the BSSID generated in real-time during a configuration process. In some embodiments, the configuration application 310 generates BSSIDs in real-time for transfer to slave base stations through connected wireless stations.

The slave base station manager 320 registers slave base stations such as the slave base station 130 in association with a particular master slave station such as the master slave station 120, including MAC addresses and BSSIDs.

The wireless station manager 330 registers wireless stations directly connecting without an intervening slave base station. In some cases, wireless stations can be handed off to slave base stations, or handed off from slave base stations.

The networking communication module 340 comprises a Bluetooth transceiver 342 (e.g., BLTE transceiver), a Wi-Fi transceiver 344, and an Ethernet port 344. In one instance, IEEE 802.11 network packets are received from slave base stations, on behalf of wireless stations connected to slave stations. Wi-Fi network packets are transformed to Ethernet packets are forwarded as addressed. The reverse data path is also handled by the networking communication module 340. Other embodiments with different transceivers are possible.

Figure 4:
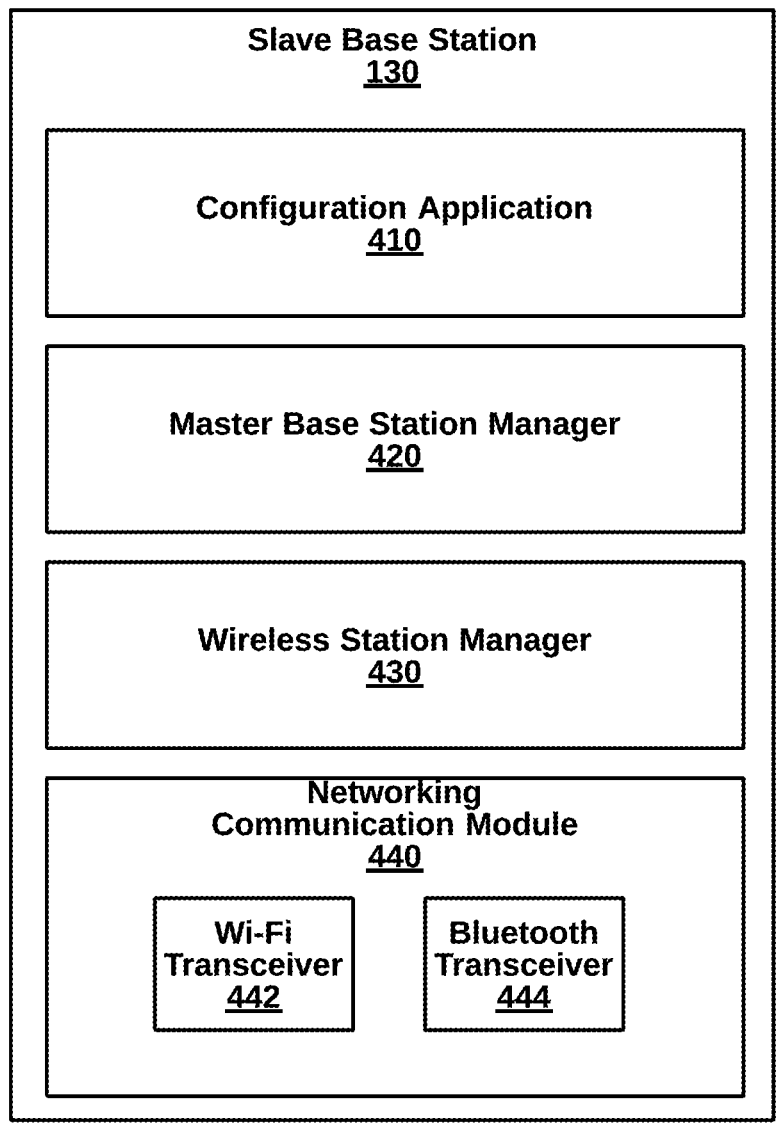
FIG. 4 is a more detailed block diagram illustrating an slave base station of the system of FIG. 1, according to an embodiment.

FIG. 4 is a more detailed block diagram illustrating the slave base station 130 of the system of FIG. 1, according to an embodiment. The slave base station 130 features a configuration application 410, a slave base station manager 420, a wireless station manager 430, and a networking communication module 440.

The configuration application 410 can be executed as part of an operating system, or alternatively, as an application interacting with an operating system. The configuration application 410 receives dynamic WDS confirmation data. Sometime thereafter, a connection request is received from a slave base station. For example, the connection request can be a probe request using the BSSID generated in real-time during a configuration process. In some embodiments, the configuration application 410 generates BSSIDs in real-time for transfer to slave base stations through connected wireless stations.

The master base station manager 420 registers slave base stations such as the master base station 120 in association with a particular wireless station such as the wireless station 140, including MAC addresses and BSSIDs. Some embodiments of the master base station manager 420 registers more than one master base stations, allowing assignments of wireless stations to different master base stations. Load balancing algorithms can determine the assignments of wireless stations to particular master base stations.

The wireless station manager 430 registers wireless stations directly connecting with or without an intervening slave base station. In some cases, wireless stations can be handed off to master base stations or other slave base stations, or handed off from other slave base stations or master base stations.

The networking communication module 440 comprises a Wi-Fi transceiver 442 and a Bluetooth transceiver 444. In one instance, Bluetooth packets are received with WDS configuration data. A BSSID can be embedded into a probe request sent to master base station with Wi-Fi data packets. After configuration, IEEE 802.11 network packets are received from other downstream slave base stations, on behalf of wireless stations connected to those slave stations. IEEE 802.11 network packets are also received from wireless stations directly connected. Wi-Fi network packets are retransmitted as Wi-Fi network packets when forwarded to master base stations. The reverse data path is also handled by the networking communication module 440. Optionally, an Ethernet port or other type of transceiver can be included on the slave base station 130.

Figure 5:
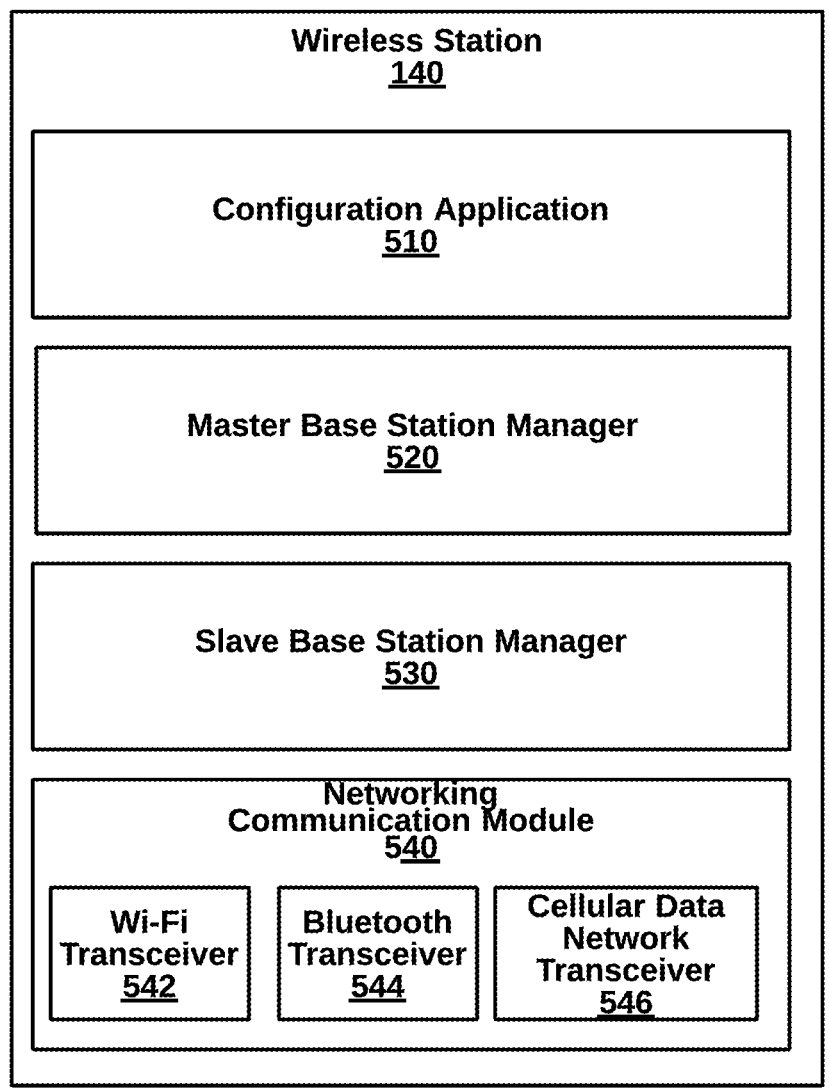
FIG. 5 is a more detailed block diagram illustrating a wireless station of the system of FIG. 1, according to an embodiment.

FIG. 5 is a more detailed block diagram illustrating the wireless station 140 of the system of FIG. 1, according to an embodiment. The wireless station 140 includes a configuration application 510, a master base station manager 520, a slave base station manager 530, and a networking communication module 540.

The configuration application 510 can be executed as part of an operating system, or alternatively, as an application interacting with an operating system. The configuration application 510 receives dynamic WDS confirmation data over a Wi-Fi or cellular network for retransmitting over a Bluetooth channel to slave base stations (and visa versa). The configuration application 510 is communicatively coupled with each of the transceivers for recognizing data that needs to be processed for transmission over a different transceiver. In an embodiment, users can be prompted by the configuration application 510 to enter credentials for reaching a particular user account at the configuration server 110.

The master base station manager 520 registers master base stations such as the master base station 130, including MAC addresses and BSSIDs.

The slave base station manager 530 registers slave base stations directly connecting without an intervening slave base station. In some cases, wireless stations can be handed off to slave base stations, or handed off from slave base stations.

The networking communication module 540 comprises a Wi-Fi transceiver 542, a Bluetooth transceiver 544, and a cellular data network transceiver 546.

Figure 6A:
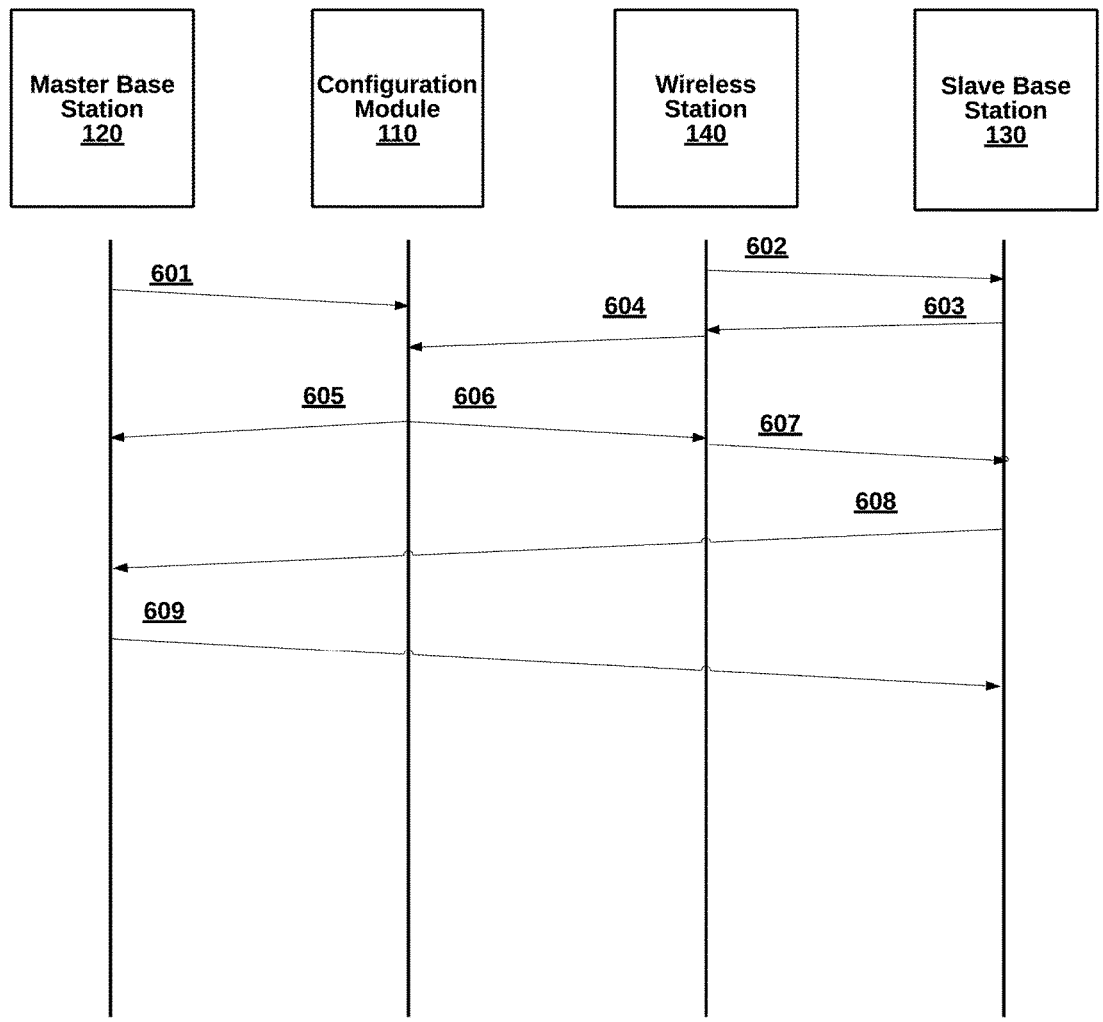
FIG. 6A-6B is a sequence diagram illustrating interactions between components of the system in FIG. 1, according to one embodiment.
Figure 6B:
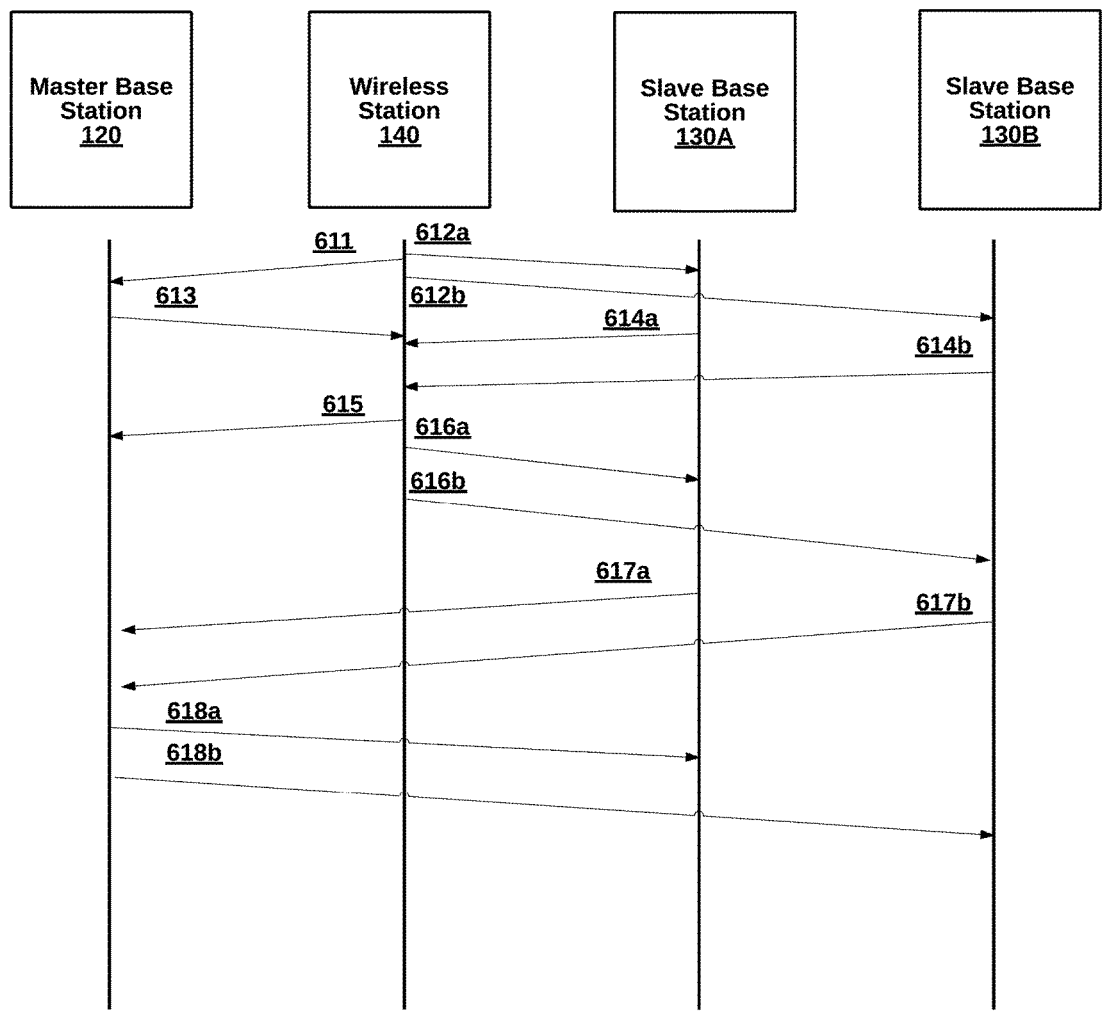

FIGS. 6A-6B are sequence diagrams illustrating interactions 600 between components of the system in FIGS. 1A and 1B, accordingly. The specific interactions shown in FIGS. 6A-6B and described below can be performed in different orders, can include many sub-interactions, and still be contemplated by the present disclosure. Moreover, the methods below of FIGS. 7-9 describe processes that are internal to the components, as opposed to the external messages exchanged in FIGS. 6A-B.

In FIG. 6A, the master base station 120 connect with the configuration module 110 (interaction 601). Separately, the slave base station, after establishing a Bluetooth connection with the wireless station 140 (interactions 602, 603), connects with the configuration module 110 through the wireless station 140 (interactions 604).

WDS configuration data is sent to both the master base station 120 (interaction 605) and to the slave base station 130 through the wireless station 140 (interactions 606, 607). Finally, the WDS configuration data is sent from the slave base station 130 to the master base station 120 (interaction 608) and an acknowledgment of the connection can be returned (interaction 609).

In FIG. 6B, the wireless station 140 connects with the master base station (interactions 611, 613) and separately, the slave base stations 130A-B (interactions 612a,b, 614a, b). WDS configuration data is sent from the wireless station 140 to the master base station 120 (615) and the slave base stations 130A-B (interactions 616a,b). Using the WDS configuration data, the slave base stations 130A-B connect directly to the master base station (617a,b, 618a,b).

II. Methods for Wireless WDS Configuration
(FIGS. 7-9)

Figure 7:
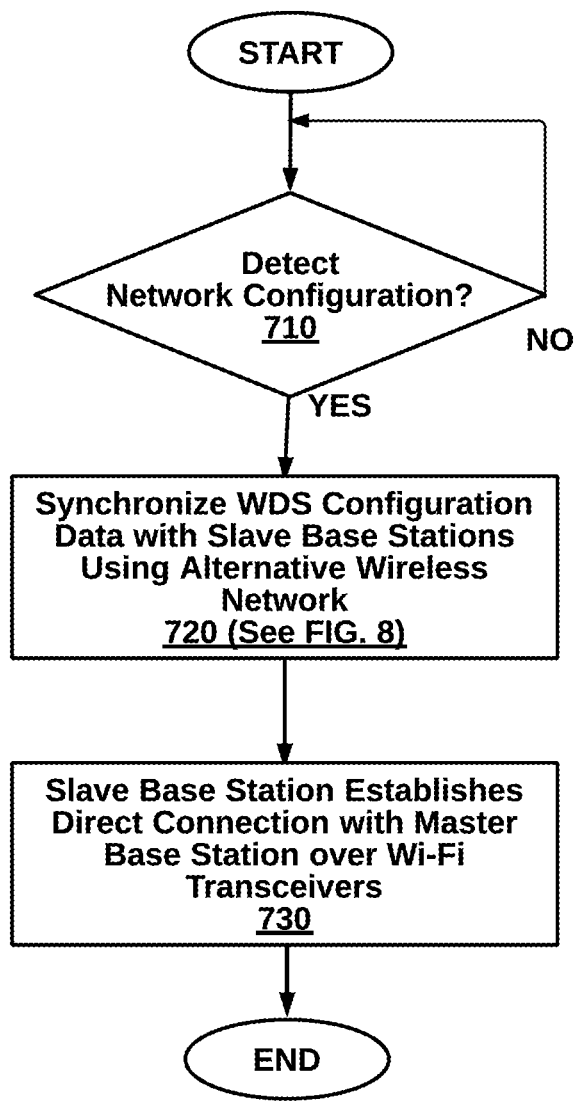
FIG. 7 is a high-level flow diagram illustrating a method for wirelessly configuring wireless distribution nodes using a mobile station, according to one embodiment.
Figure 8:
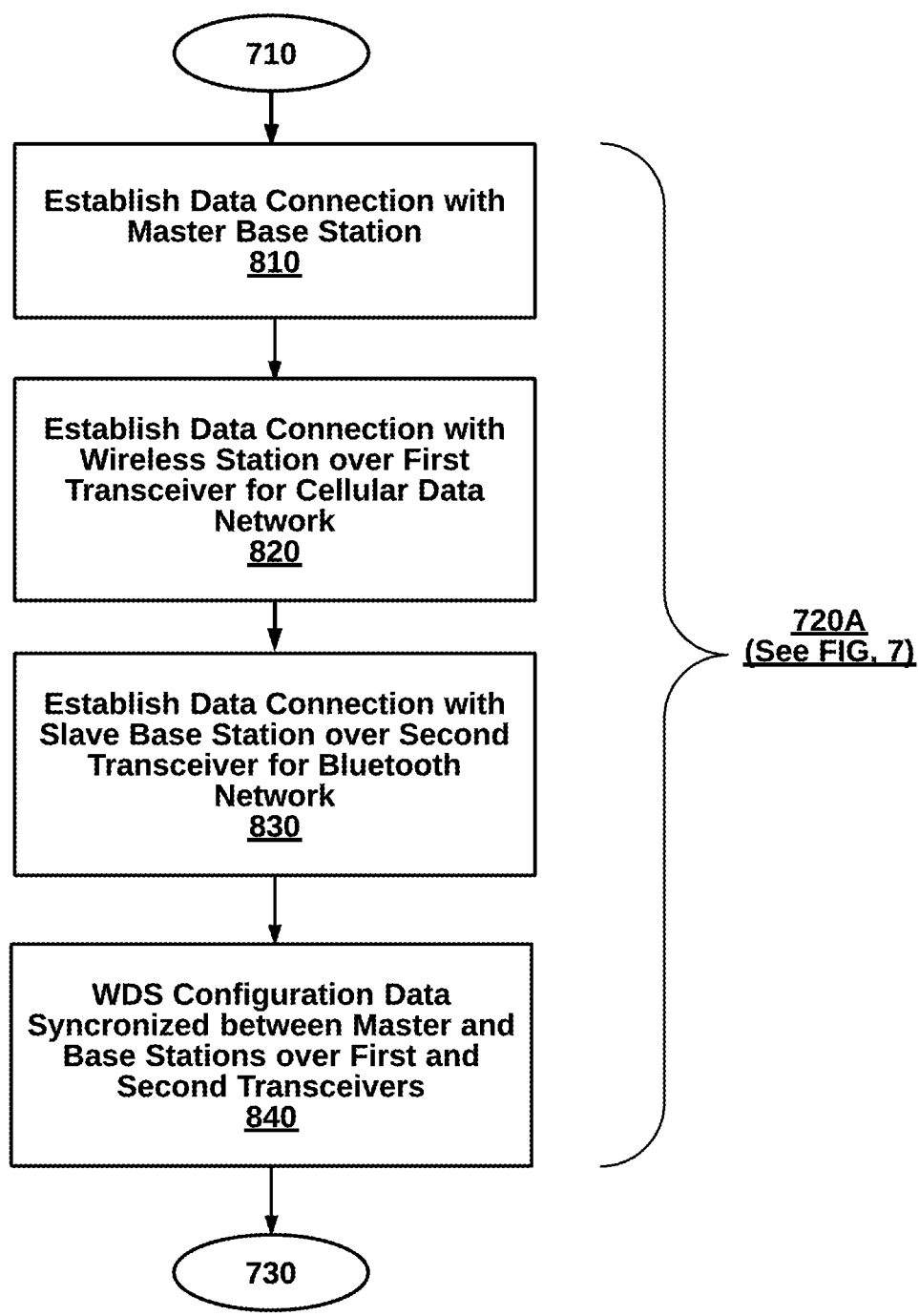
FIG. 8 is a more detailed flow diagram illustrating a first embodiment of a step of synchronizing WDS configuration data between the master base station and the slave base station, from the method of FIG. 7.

FIG. 7 is a high-level flow diagram illustrating a method 700 for wirelessly configuring wireless distribution nodes from the wireless station 140, according to one embodiment. The method 700 is one example of the operation for the system 100 or other referral systems, without limitation.

At step 710, a network configuration is detected. For example, the network configuration can be an out of the box set up of a Wi-Fi network with range extenders. In another example, the network configuration can be a power down followed by a power up in which authentication is needed by base slave stations.

At step 720, wireless stations use a Bluetooth connection to synchronize WDS configuration data with slave base stations to facilitate a Wi-Fi connection between the slave base stations and the master base stations.

The method 700 continues back to step 710 until another network configuration is detected. The next network configuration can involve a modification to the network configuration of the same user account, or can involve a different user account.

FIG. 8 is a more detailed flow diagram illustrating step 720A (first embodiment of the step 720) of synchronizing WDS configuration data between a master base station to a slave base station over an external network (e.g., see system 100A of FIG. 1A), from the method of FIG. 7, according to an embodiment.

At step 810, a data connection is established with a master base station. In one implementation, master base stations are pre-configured with an IP address of a configuration server for automatically connecting. Once the communication channel is established, applications can send commands between the configuration server and the master base station. For example, users can log into user accounts on the configuration server with authentication credentials in order to add network devices to the user account for management.

At step 820, a data connection is established with a wireless station over a first transceiver, for example, for a cellular data network. A mobile app in wireless stations can also be pre-configured with an IP address of a configuration server for automatically connecting.

At step 830 a wireless station establishes a data connection with the slave base station over a second transceiver, for example, for a Bluetooth network. As a result, a mobile app of a wireless station communicates with an application on the slave base station.

At step 840, WDS configuration data is synchronized between the master and slave base stations. One embodiment generates WDS configuration data at either device which is securely transmitted to the slave base stations.

FIG. 9 is a high-level flow diagram illustrating a step 720B (second embodiment of the step 720) for wirelessly configuring wireless distribution nodes from a wireless station without use of an external network (e.g., see system 100B of FIG. 1B), according to one embodiment.

At step 910, the wireless station connects to a master base stations over a first transceiver, for example, for a Wi-Fi network. At step 920, the wireless station connects to slave base stations over a second transceiver, for example, for a Bluetooth network.

At step 930, the wireless station synchronizes WDS configuration data between the master and slave base stations. Optionally, dynamic WDS configuration data is generated by the wireless stations or the master base station.

IV. Generic Computing Device (FIG. 10)

Figure 10:
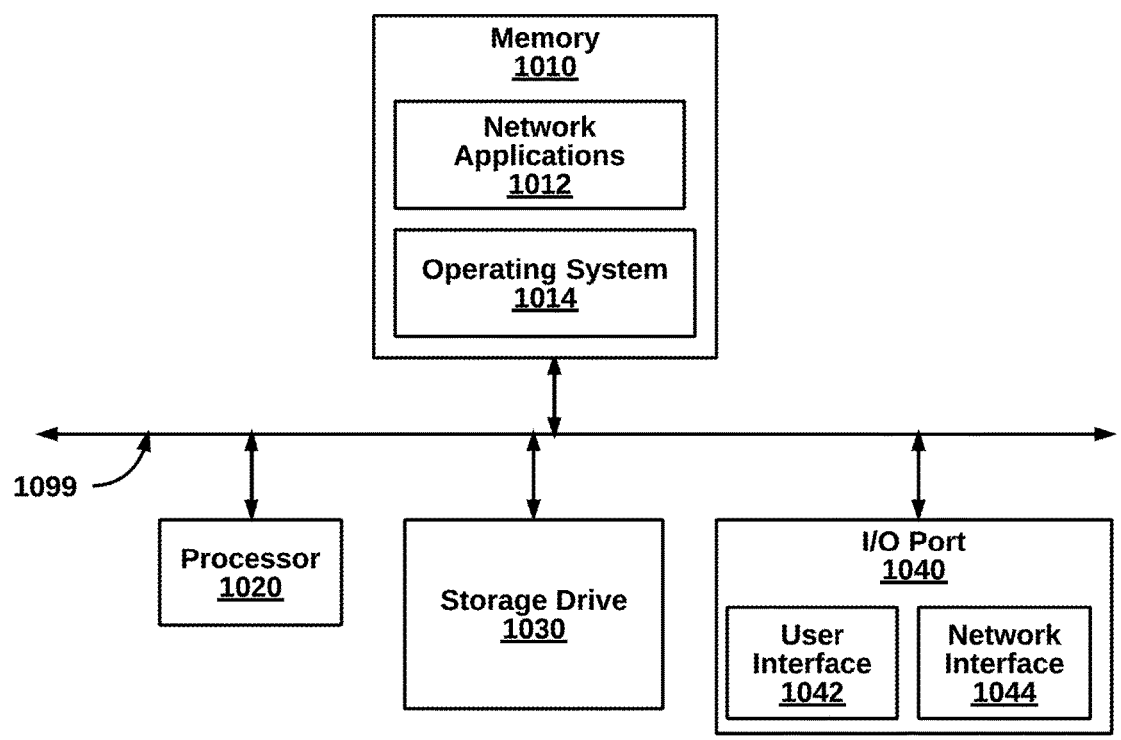
FIG. 10 is a block diagram illustrating an exemplary computing device for implementing the techniques described herein, according to one embodiment.

FIG. 10 is a block diagram illustrating an exemplary computing device 1000 for use in the systems 100A-B of FIGS. 1A-B, according to one embodiment. The computing device 1000 is an exemplary device that is implementable for each of the components of the system 100, including the cloud control element 110, the access points 121A,B, 131, and the station 140. The computing device 1000 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 1000, of the present embodiment, includes a memory 1010, a processor 1020, a storage drive 1030, and an I/O port 1040. Each of the components is coupled for electronic communication via a bus 1099. Communication can be digital and/or analog, and use any suitable protocol.

The memory 1010 further comprises network applications 1012 and an operating system 1014. The network applications 1012 can include the modules of the components illustrated in FIG. 1. Other network applications 1012 can include a web browser, a mobile application, an application that uses networking, a remote application executing locally, a network protocol application, a network management application, a network routing application, or the like.

The operating system 1014 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 1020 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 1020 can be single core, multiple core, or include more than one processing elements. The processor 1020 can be disposed on silicon or any other suitable material. The processor 1020 can receive and execute instructions and data stored in the memory 1010 or the storage drive 1030.

The storage drive 1030 can be any non-volatile type of storage such as a magnetic disc, EEPROM, Flash, or the like. The storage drive 630 stores code and data for applications.

The I/O port 1040 further comprises a user interface 1042 and a network interface 1044. The user interface 642 can output to a display device and receive input from, for example, a keyboard. The network interface 1044 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a configuration server of a data communication network and remote from a local Wi-Fi network, implemented at least partially in hardware, for wirelessly configuring slave base stations in a wireless portion of the data communication network, the method comprising the steps of:
   storing WDS (wireless distribution system) configuration data for a master base station having a wired connection to the data communication network on the configuration server remote from the local Wi-Fi network, the master base station providing wireless access via the local Wi-Fi network for wireless stations to access the data communication network;
   establishing a data connection with a wireless station having a first radio for wireless connection to the data communication network, and the wireless station having a second radio for wireless connection to a slave base station over a second wireless data network, the wireless station second radio within radio range of the slave base station;
   generating updated dynamic WDS configuration data unique from previous dynamic WDS configuration for the slave base station from the WDS configuration data of the master base station;
   sending the updated generated dynamic WDS configuration data to the wireless station, wherein the wireless station forwards the updated generated dynamic WDS configuration data to the slave base station using the second radio on the second wireless data network; and
   sending the updated generated dynamic WDS configuration data to the master base station to synchronize dynamic WDS configuration data for authentication of the slave base station;
   wherein a plurality of slave base stations are configured along with the slave base station and further comprising:
      detecting that one of the plurality of slave base stations has been removed from communication with the master base station; and
      responsive to the detection, generating new dynamic configuration data for the slave base station and remaining of the plurality of slave base stations for configuring under new credentials.

2. The method of claim 1, further comprising:
   receiving WDS configuration data for the master base station, from the master base station, prior to generating dynamic WDS configuration data.

3. The method of claim 1, wherein the dynamic WDS configuration data comprises a dynamically generated SSID (service set identifier).

4. The method of claim 1, wherein the dynamic WDS configuration data comprises authentication credentials.

5. The method of claim 1, further comprising:
   receiving an indication that the slave base station is with radio range of the master base station.

6. The method of claim 1, wherein a plurality of slave base stations are configured along with the slave base station, successively when within radio range of the wireless station.

7. A non-transitory computer-readable medium for storing instructions that, when executed by a processor, perform method in a configuration server of a data communication network and remote from a local Wi-Fi network, implemented at least partially in hardware, for wirelessly configuring slave base stations in a wireless portion of the data communication network, the method comprising the steps of:
   storing WDS (wireless distribution system) configuration data for a master base station having a wired connection to the data communication network on the configuration server remote from the local Wi-Fi network, the master base station providing wireless access via the local Wi-Fi network for wireless stations to access the data communication network;
   establishing a data connection with a wireless station having a first radio for wireless connection to the data communication network, and the wireless station having a second radio for wireless connection to a slave base station over a second wireless data network, the wireless station second radio within radio range of the slave base station;
   generating updated dynamic WDS configuration data unique from previous dynamic WDS configuration for the slave base station from the WDS configuration data of the master base station;
   sending the updated generated dynamic WDS configuration data to the wireless station, wherein the wireless station forwards the updated generated dynamic WDS configuration data to the slave base station using the second radio on the second wireless data network; and
   sending the updated generated dynamic WDS configuration data to the master base station to synchronize dynamic WDS configuration data for authentication of the slave base station;
   wherein a plurality of slave base stations are configured along with the slave base station and further comprising:
      detecting that one of the plurality of slave base stations has been removed from communication with the master base station; and
      responsive to the detection, generating new dynamic configuration data for the slave base station and remaining of the plurality of slave base stations for configuring under new credentials.

8. A configuration server of a data communication network and remote from a local Wi-Fi network, implemented at least partially in hardware, for wirelessly configuring slave base stations in a wireless portion of the data communication network, the configuration server comprising:
   a memory to store WDS (wireless distribution system) configuration data for a master base station having a wired connection to the data communication network on the configuration server remote from the local Wi-Fi network, the master base station providing wireless access via the local Wi-Fi network for wireless stations to access the data communication network;

a network interface to establish a data connection with a wireless station having a first radio for wireless connection to the data communication network, and the wireless station having a second radio for wireless connection to a slave base station over a second wireless data network, the wireless station second radio within radio range of the slave base station;

a processor, coupled with the memory and the network interface, to generate updated dynamic WDS configuration data unique from previous dynamic WDS configuration for the slave base station from the WDS configuration data of the master base station;

wherein the network interface transmits the updated generated dynamic WDS configuration data to the wireless station, wherein the wireless station forwards the updated generated dynamic WDS configuration data to the slave base station using the second radio on the second wireless data network, and transmits the updated generated dynamic WDS configuration data to the master base station to synchronize dynamic WDS configuration data for authentication of the slave base station;

wherein a plurality of slave base stations are configured along with the slave base station and the processor detects that one of the plurality of slave base stations has been removed from communication with the master base station, and responsive to the detection, the processor generates new dynamic configuration data for the slave base station and remaining of the plurality of slave base stations for configuring under new credentials.

* * * * *